(12) United States Patent
Rahm et al.

(10) Patent No.: US 12,049,157 B2
(45) Date of Patent: Jul. 30, 2024

(54) TRAILER VEHICLE UNIT FOR A TOWING VEHICLE

(71) Applicant: Volvo Truck Corporation, Gothenburg (SE)

(72) Inventors: Fredrik Rahm, Hörby (SE); Fredrik Larsson, Vellinge (SE)

(73) Assignee: Volvo Truck Corporation, Gothenburg (SE)

( * ) Notice: Subject to any disclaimer, the term of this patent is extended or adjusted under 35 U.S.C. 154(b) by 141 days.

(21) Appl. No.: 17/987,951

(22) Filed: Nov. 16, 2022

(65) Prior Publication Data

US 2023/0158891 A1 May 25, 2023

(30) Foreign Application Priority Data

Nov. 25, 2021 (EP) .................................. 21210505

(51) Int. Cl.
 *H01M 8/04664* (2016.01)
 *B60L 7/18* (2006.01)

(52) U.S. Cl.
 CPC ........... *B60L 7/18* (2013.01); *B60Y 2200/147* (2013.01)

(58) Field of Classification Search
 CPC .......................... B60L 7/18; B60Y 2200/147
 See application file for complete search history.

(56) References Cited

U.S. PATENT DOCUMENTS

| 2008/0174174 A1 | 7/2008 | Burns et al. |
| 2018/0093655 A1* | 4/2018 | Healy ............... B60L 1/003 |

FOREIGN PATENT DOCUMENTS

| EP | 3305633 A1 | 4/2018 |
| WO | 2010098881 A2 | 9/2010 |
| WO | 2010098881 A3 | 12/2010 |
| WO | 12128770 A1 | 9/2012 |
| WO | 2013096084 A1 | 6/2013 |

OTHER PUBLICATIONS

Extended European Search Report for European Patent Application No. 21210505.0, mailed May 4, 2022, 7 pages.

* cited by examiner

*Primary Examiner* — Muhammad S Islam

(74) *Attorney, Agent, or Firm* — Withrow & Terranova, PLLC

(57) ABSTRACT

A trailer vehicle unit for a towing vehicle, the trailer vehicle unit having a coupling configured to couple to the towing vehicle and an electrical energy dissipating system at least partly disposed in a fluid medium conduit for receiving fluid medium, the electrical energy dissipating system being configured to receive electric energy and to dissipate received electric energy by utilizing a flow of fluid medium, wherein the trailer vehicle unit further comprises a slave control unit having a processing circuitry configured to receive a signal from the towing vehicle indicative of a request for dissipating energy the electrical energy dissipating system.

17 Claims, 7 Drawing Sheets

TRAILER VEHICLE UNIT FOR A TOWING VEHICLE

RELATED APPLICATIONS

The present application claims priority to European Patent Application No. 21210505.0, filed on Nov. 25, 2021, and entitled "TRAILER VEHICLE UNIT FOR A TOWING VEHICLE," which is incorporated herein by reference in its entirety.

TECHNICAL FIELD

The present invention relates to a trailer vehicle unit for a towing vehicle. The present invention also relates to a vehicle combination comprising such trailer vehicle unit. Although the invention will mainly be directed to a towing vehicle in the form of a truck using an electric traction motor propelling the vehicle combination, the invention may also be applicable for other types of vehicles and vehicle combinations at least partially propelled by an electric traction motor, such as e.g. an electric vehicle, a hybrid vehicle comprising an electric machine as well as an internal combustion engine for propulsion. In addition, the present invention may be used in a vehicle combination comprising a number of trailer vehicle units.

BACKGROUND

The propulsion systems of vehicles are continuously developed to meet the demands from the market. A particular aspect relates to the emission of environmentally harmful exhaust gas. Therefore, vehicles propelled by electric machines and/or electric machine receiving electric power from hydrogen fuel cells have been increasingly popular, in particular for trucks and other heavy-duty vehicles.

In comparison to a vehicle propelled solely by an internal combustion engine (ICE), a vehicle propelled by an electric machine conventionally struggles with obtaining the desired functionality of auxiliary braking. For an ICE operated vehicle, the auxiliary braking can be achieved by means of a retarder or by so called engine braking. However, for an electric vehicle, the auxiliary braking functionality can be a dimensioning factor for the cooling system since the cooling capacity of e.g., a fuel cell electric vehicle (FCEV) as well as a battery electric vehicle (BEV) is a limiting factor. The reason is that for such type of vehicles, the auxiliary braking places a lot of energy in the cooling system.

There is thus a desire to provide an improved energy management system for managing excessive energy generated e.g., during regenerative braking of an electric vehicle which is at least partially propelled by an electric traction motor.

SUMMARY

It is thus an object of the present invention to at least partially overcome the above-described deficiencies. This object is achieved by a trailer vehicle unit according to claim 1. The objective is also achieved by the other independent claims. The dependent claims are directed to advantageous embodiments of the disclosure.

According to a first aspect, there is provided a trailer vehicle unit for a towing vehicle. The trailer vehicle unit comprises a coupling configured to couple the trailer vehicle unit to the towing vehicle. The trailer vehicle unit further comprises an electrical energy dissipating system at least partly disposed in a fluid medium conduit for receiving a fluid medium. The electrical energy dissipating system is configured to receive electric energy and to dissipate received electric energy by utilizing a flow of fluid medium. Moreover, the trailer vehicle unit comprises a slave control unit having a processing circuitry configured to receive a control signal from the towing vehicle indicative of a request for dissipating energy from the electrical energy dissipating system. Further, the processing circuitry is configured to control the electrical energy dissipating system in response to the received control signal so as to dissipate energy from the electrical energy dissipating system.

Hereby, the electrical energy dissipating system of the trailer vehicle unit is capable of dissipating excessive energy generated from regenerative braking of the towing vehicle and/or the vehicle combination.

The proposed trailer vehicle unit provides for individual control of a trailer of a vehicle combination with respect to regenerative braking by using and controlling an electrical energy dissipating system arranged on the trailer. In this manner, the proposed trailer vehicle unit is configured to improve the driving situation of a vehicle combination during a regenerative braking event. In other words, by using the proposed trailer vehicle unit in e.g., a vehicle combination in the form of a tractor-trailer combination, it becomes possible to improve driving situations where the towing vehicle is operated in a regenerative braking mode and its electric storage system is unable to receive the electric power generated during the regenerative braking operation. In such situations, the towing vehicle can send a request to the slave control unit of the trailer vehicle unit, where the request contains data indicating a need for using and controlling the electrical energy dissipating system of the trailer vehicle unit to receive electric energy generated from the regenerative braking event and to dissipate the received electric energy by utilizing the flow of fluid medium through one or more components of the electrical energy dissipating system.

In addition, or alternatively, the arrangement of the electrical energy dissipating system can be used by the towing vehicle if there is a desire not to regenerate more than a certain electric power level in the electric power system of the towing vehicle. In such situation, the electric power system of the towing vehicle can instead supply at least a portion of the generated electric power to the electrical energy dissipating system of the trailer vehicle unit which in turn dissipates the received electric energy by utilizing a flow of fluid medium. By way of example, the generated electric power is supplied to an electric machine of the electrical energy dissipating system which in turn, by means of the received electric power, operates an air compressor to force a flow of fluid medium in the form of air through the fluid medium conduit in the form of an air conduit. Other examples of suitable electrical energy dissipating systems are described in the following description. An advantage is thus that the electrical energy dissipating system is able to dissipate electric power which cannot be handled by the electric storage system of the towing vehicle.

To this end, by the arrangement of the electrical energy dissipating system in the trailer vehicle unit, it becomes possible to improve the energy management of the vehicle combination by allowing the electrical energy dissipating system of the trailer vehicle unit to dissipate an additional amount of energy during braking with e.g., a heavier-duty vehicle combination. This may further allow for an improved balancing of the available brake capability of the vehicle combination without adding extra equipment or weight on the towing vehicle itself.

In addition, by the proposed trailer vehicle unit, the auxiliary braking capability provided from the trailer may be more efficiently matched with the needs from the towing vehicle. Further, it may also have a positive impact on the required components and weight of the towing vehicle because the towing vehicle may not need to be equipped with an overly over-dimension braking system for both the towing vehicle and any trailers coupled thereto.

To this end, the proposed trailer vehicle unit when coupled to the towing vehicle, is capable of contributing to the general braking strategy of the coupled vehicle combination in a positive and efficient manner. Such arrangement and configuration of the vehicle combination may also at least partly reduce any potential problems between the towing vehicle and the trailer during driving. One example of a potential problem may refer to a situation with potential jack knifing between the towing vehicle and the trailer.

Favourably, the control of the electrical energy dissipating system may be controlled and coordinated with any braking system of the towing vehicle so as to provide an even more efficient vehicle combination energy management system for handling excessive energy from regenerative braking events.

It should be noted that the provision of the slave control unit having the processing circuitry configured to receive a control signal from the towing vehicle refers to driving situation when the trailer vehicle unit is in a coupled state with the towing vehicle. Hence, the processing circuitry of the slave control unit is configured to receive a control signal from the towing vehicle indicative of a request for dissipating energy from the electrical energy dissipating system when the trailer vehicle unit is in the coupled state with the towing vehicle. The coupled state here refers to a state between the towing vehicle and the trailer vehicle unit wherein the trailer vehicle unit is mechanically coupled to the towing vehicle, and wherein there is an electrical connection established between the trailer vehicle unit and the towing vehicle. In addition, in the coupled state, there is also generally a communication established between the slave control unit of the trailer vehicle unit and the towing vehicle.

The slave control unit may generally be arranged in communication with the electrical energy dissipating system. In addition, or alternatively, the slave control unit may be an integral part of the electrical energy dissipating system.

The electrical energy dissipating system can be provided in several different manners, as further described herein.

The fluid medium may typically be air. However, in some example embodiments, the fluid medium may be a liquid, such as a coolant. One example of a liquid coolant is a liquid containing glycol. As such, the term "fluid medium", as used herein, generally encompasses any one of a gaseous fluid medium, such as air and a liquid fluid medium, such as liquid coolant. In particular, the term "fluid medium" refers to any one of air and liquid coolant.

Hence, according to example embodiments, the fluid medium is air and the fluid medium conduit is an air conduit for receiving air. In such example embodiments, when the fluid medium is air, there is provided a trailer vehicle unit for a towing vehicle, wherein the trailer vehicle unit comprises a coupling configured to couple the trailer vehicle unit to the towing vehicle. The trailer vehicle unit further comprises an electrical energy dissipating system at least partly disposed in an air conduit for receiving air. The electrical energy dissipating system is configured to receive electric energy and to dissipate received electric energy by utilizing a flow of air. Moreover, the trailer vehicle unit comprises a slave control unit having a processing circuitry configured to receive a control signal from the towing vehicle indicative of a request for dissipating energy from the electrical energy dissipating system. Further, the processing circuitry is configured to control the electrical energy dissipating system in response to the received control signal so as to dissipate energy from the electrical energy dissipating system.

According to one example embodiment, wherein the fluid medium is air, the electrical energy dissipating system comprises an electric machine operable from the received electric energy and an air flow producing unit connected to an output shaft of the electric machine. The air flow producing unit is operable by the electric machine by rotation of the output shaft. Further, the air flow producing unit is arranged in the fluid medium conduit in the form of an air conduit. This configuration of the electrical energy dissipating system provides for a less complex system with few components. Another advantage is that such auxiliary braking system of the trailer vehicle unit provides for an increased controllability at all speeds.

The term "air flow producing unit", as used herein, generally refers to an arrangement configured to generate and convey a flow of air through the air conduit. The air flow producing unit may thus be any one of an air fan operated by the electric machine, an air compressor operated by the electric machine and an air blower device operated by the electric machine. Typically, the air flow producing unit may increase the temperature level of the air flowing therethrough.

Also, the air flowing through the air flow producing unit may be heated, and the heated air can thus be used for heating components of the vehicle in need of thermal management.

According to one example embodiment, the electrical energy dissipating system comprises an air heating arrangement. The air heating arrangement comprises at least one electric air heater operable from the received electric energy. The air heating arrangement is arranged in the fluid medium conduit in the form of an air conduit. This configuration of the electrical energy dissipating system provides for a less complex system with few components. Another advantage is that such auxiliary braking system of the trailer vehicle unit provides for an increased performance at high speeds where the system receives air from the ambient environment to cool the electric air heater. To this end, the system is able to make use of the air velocity at higher vehicle speeds. This system can favourable be arranged or positioned at the roof of the trailer vehicle unit.

The air heating arrangement provides for dissipating electric power during regenerative braking. The air heating arrangement may be an electric brake resistor arrangement, whereby the at least one electric air heater in such a case is an electric brake resistor. The air heating arrangement may advantageously be incorporated in the electrical energy dissipating system for heating the air in the air conduit.

According to one example embodiment, the electrical energy dissipating system comprises the electric machine operable from the received electric energy, the air flow producing unit connected to the output shaft of the electric machine, and the air heating arrangement comprising the at least one electric air heater operable from the received electric energy. In this example embodiment, the at least one electric air heater is arranged in the air conduit in downstream fluid communication with the air flow producing unit. An advantage is thus that when the electric machine is unable to receive all electric power that needs to be dissipated, the electric power system can supply electric power also to the at least one electric air heater. Thus, an improved electric energy dissipation capacity is provided. In addition, by using an electrical energy dissipating system having both the air flow producing unit and the air heating arrangement, it becomes possible to benefit from transferring air with a high flow from the air flow producing unit to the electric air heater. Thereby, it becomes possible to maximize the temperature level of the components making up the system, thus also increasing the power dissipation for a certain air mass flow. This arrangement may further provide an increased usage flexibility and an even further increased power dissipation capability.

By way of example, the air flow producing unit is arranged to compress the received air and transmit the compressed air to the at least one electric air heater. According to one example embodiment, the air flow producing unit is an air compressor arranged to compress the received air and transmit the compressed air to the at least one electric air heater.

Optionally, the electrical energy dissipating system may further comprise an air flow restriction arrangement positioned downstream the air heating arrangement.

According to one example embodiment, wherein the fluid medium is a liquid coolant and the fluid medium conduit is a liquid coolant conduit, the electrical energy dissipating system comprises a liquid coolant heating arrangement. The liquid coolant heating arrangement comprises at least one electric brake resistor arrangement operable from the received electric energy. The liquid coolant heating arrangement is arranged in the liquid coolant conduit in the form of a liquid coolant conduit. As mentioned herein for the air heating arrangement, the electric brake resistor arrangement may generally be provided by at least one electric brake resistor. Accordingly, the electrical energy dissipating system comprises a liquid coolant heating arrangement, the liquid coolant heating arrangement being disposed in the liquid coolant conduit and comprising at least one electric brake resistor arrangement operable from the received electric energy.

The electrical energy dissipating system can be installed in the trailer vehicle unit in various ways depending on the type of trailer vehicle unit, and may even be designed to be retrofitted to one or many standard trailers.

According to one example embodiment, the trailer vehicle unit further comprises a mounting structure for arrangement of the electrical energy dissipating system to the trailer vehicle unit. The mounting structure may be any one of a housing for accommodating the electrical energy dissipating system, a frame structure for holding the electrical energy dissipating system and a bracket assembly comprising one or more brackets for fixating the electrical energy dissipating system to the trailer vehicle unit.

By way of example, the mounting structure is arranged vertically below a supporting frame structure of the trailer vehicle unit.

Optionally, the electrical energy dissipating system may be releasably attached to the mounting structure. This type of arrangement provides for a temporarily mounting of the electrical energy dissipating system to the trailer vehicle unit.

According to one example embodiment, the electrical energy dissipating system is configured to be retrofitted into the trailer vehicle unit.

According to one example embodiment, the trailer vehicle unit further comprises a conventional service brake system.

By way of example, the trailer vehicle unit further comprises one or more wheel brake devices.

According to one example embodiment, the trailer vehicle unit further comprises an electric drive axle arrangement. By way of example, the electric drive axle arrangement comprises one or more electric hub motors for providing traction to one or more wheels of the trailer vehicle unit, wherein the electrical energy dissipating system is configured to receive electric energy from the electric hub motors. The combination of the electrical energy dissipating system in the trailer vehicle unit and an electric drive axle arrangement may be particularly suitable for avoiding, or at least reducing the risk of jack knifing between the tractor vehicle and the trailer vehicle unit. The combination of the electrical energy dissipating system in the trailer vehicle unit and the electric drive axle arrangement provides for enhance energy dissipation so as to allow braking with the trailer vehicle unit and any traction motors on the trailer vehicle unit.

The slave control unit can be configured in several different manners in view of the type of trailer vehicle unit and the type of towing vehicle. Typically, the slave control unit may be configured to control the supply of electric energy from the towing vehicle to the electrical energy dissipating system in response to the received signal from the towing vehicle so as to permit the electrical energy dissipating system to dissipate received electrical energy generated from a regenerative braking event of the towing vehicle.

According to a second aspect, there is provided a vehicle combination formed by a towing vehicle and one or more trailer vehicle units according to the first aspect, including any one of the features, examples and embodiments relating to the first aspect.

Effects and features of the second aspect are largely analogous to those described above in relation to the first aspect.

According to one example embodiment, the vehicle combination is any one of an on-the-road vehicle combination, an off-the road vehicle combination and a combination thereof.

The vehicle combination may generally comprise more than one trailer vehicle unit. In one example embodiment, the vehicle combination comprises a towing vehicle in the form of a tractor unit, a trailer vehicle unit in the form of a semitrailer comprising an electrical energy dissipating system, and further a trailer vehicle unit in the form of a trailer comprising a corresponding electrical energy dissipating system.

Typically, the towing vehicle comprises a master control unit having a processing circuitry configured to control the electrical energy dissipating system of the trailer vehicle unit. By way of example, the master control unit is configured to control the electrical energy dissipating system of the trailer vehicle unit via the slave control unit of the trailer vehicle unit. As such, the electrical energy dissipating system is arranged to operate in a slave mode with regard to the master control unit arranged in the towing vehicle. In addition, or alternatively, the master control unit may be configured to directly control the electrical energy dissipating system of the trailer vehicle unit.

The master control unit may be arranged in communication with an electric power system of the towing vehicle. The master control unit may be configured to: receive a signal indicative of a regenerative braking request for the vehicle combination, determine a level of electric power generated by an electric traction motor during the regenerative braking of the vehicle combination, receive a signal indicative of a current electric charging capacity of an electric storage system, compare the level of electric power generated during the regenerative braking with the current electric charging capacity of the electric storage system, and control the electric power system to supply electric power to the electrical energy dissipating system during the regenerative braking when the level of electric power generated during the regenerative braking is higher than the current charging capacity of the electric storage system.

The towing vehicle may further comprise the electric traction motor configured to propel the towing vehicle and to controllably regenerate electric power during regenerative braking of the vehicle combination, the electric machine and the electric power system electrically connected to the electric machine. The electric power system may comprise the electric storage system configured to receive and supply electric power, wherein the electric machine is operated by electric power received from the electric power system. In addition, the electric power system may further be electrically connected to the electric traction motor and configured to receive electric power during regenerative braking.

In addition, or alternatively, the master control unit may be configured to selectively control the electric power system to supply electric power to the electrical energy dissipating system or to the electric machine during the regenerative braking when the level of electric power generated during the regenerative braking is higher than the current charging capacity of the electric storage system.

According to one example embodiment, the towing vehicle comprises a braking system for a vehicle. The braking system comprises the electric traction motor configured to propel the vehicle and to controllably regenerate electric power during regenerative braking of the vehicle, the electric machine comprising an output shaft, an air flow producing unit connected to the output shaft of the electric machine, the air flow producing unit being operable by the electric machine by rotation of the output shaft, wherein the air flow producing unit is arranged in an air conduit, an electric power system electrically connected to the electric machine, the electric power system comprising an electric storage system configured to receive and supply electric power, wherein the electric machine is operated by electric power received from the electric power system, the electric power system being further electrically connected to the electric traction motor and configured to receive electric power during regenerative braking, and the master control unit connected to the electric power system, the master control unit comprising processing circuitry configured to receive a signal indicative of a regenerative braking request for the towing vehicle, determine a level of electric power generated by the electric traction motor during the regenerative braking of the towing vehicle, receive a signal indicative of a current electric charging capacity of the electric storage system, compare the level of electric power generated during the regenerative braking with the current electric charging capacity of the electric storage system, and control the electric power system to supply electric power to the electric machine during the regenerative braking when the level of electric power generated during the regenerative braking is higher than the current charging capacity of the electric storage system.

Moreover, the electric storage system should be construed, as also indicated above, as an arrangement configured to receive and supply electric power. According to a preferred embodiment, the electric storage system is a battery which can be charged by electric power during regenerative braking, or to supply electric power to e.g., the electric machine for operation of the air flow producing unit. The electric storage system thus has a charging capacity, which corresponds to the available electric power that the electric storage system can receive before being filled. The charging capacity may also be based on e.g., the temperature of the electric storage system, state of charge (SOC), etc. Accordingly, when the electric storage system has reached its maximum allowed state of charge level it cannot receive any further electric power. The braking system may thus be referred to as an electric braking system.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
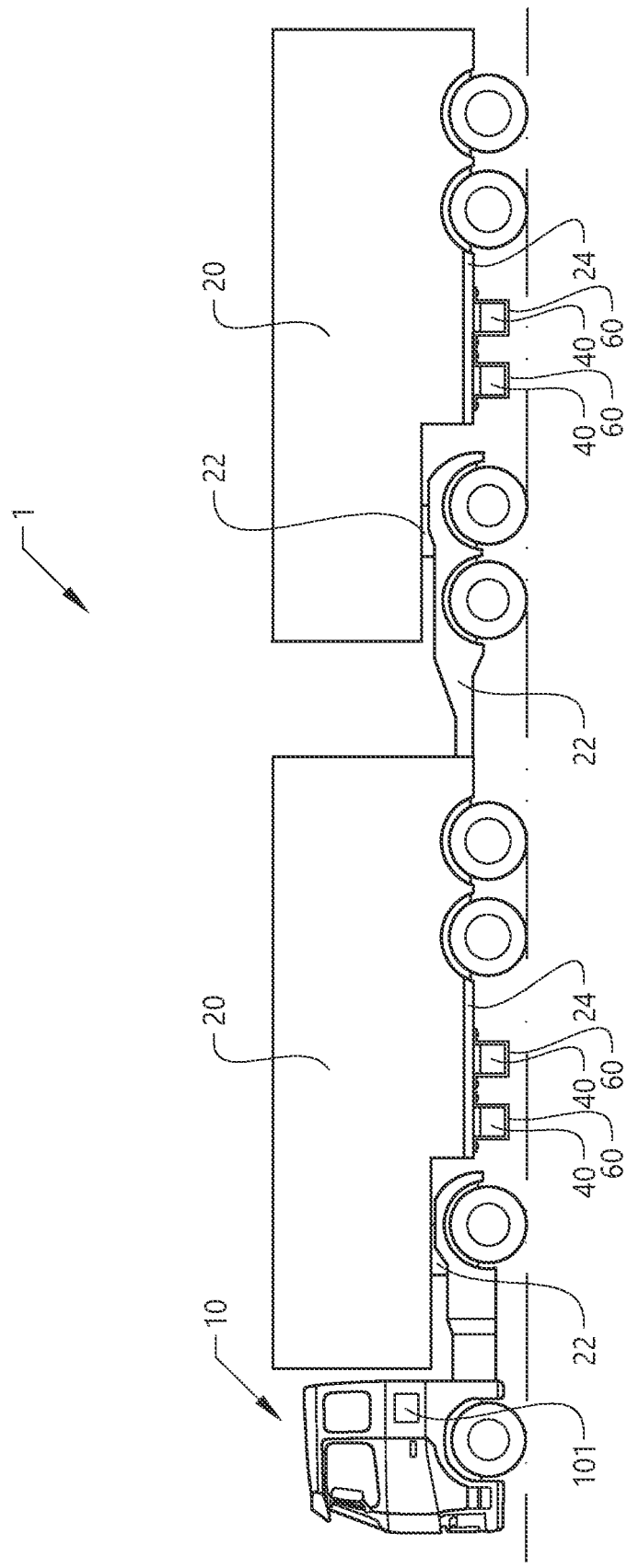
FIG. 1 is a lateral side view illustrating an example embodiment of a vehicle combination in the form of a truck and a trailer vehicle unit.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

Referring now to the drawings and to FIG. 1 in particular, there is depicted an exemplary vehicle combination 1 in the form of a towing vehicle 10 configured to be coupled to a trailer vehicle unit 20. The vehicle combination is particularly suitable for cargo transport where the herein disclosed techniques can be applied with advantage.

As illustrated in FIG. 1, the vehicle combination 1 comprises the towing vehicle in the form of the truck 10, a first trailer vehicle unit in the form of a semi-trailer 20, and a second trailer vehicle unit in the form of a conventional trailer 20. However, the truck may likewise be operated without a semi-trailer. Alternatively, the truck may likewise be operated only with the semi-trailer and not the second trailer. The trailer is here a conventional non-powered trailer, but may likewise be an electrified trailer. Further, any one of the semi-trailer and the trailer illustrated in FIG. 1 is generally a trailer vehicle unit 20, as further described herein.

Generally, each one of the towing vehicle and the trailer vehicle units of the vehicle combination comprises corresponding control units forming parts of a control system 98, as will be further described in relation to FIGS. 2A to 4. The control system is here a wireless control system. The wireless control system may of course also be implemented in other types of vehicle combinations.

While the propulsion systems of the towing vehicle 10 and the trailer vehicle units 20 of the vehicle combination may be provided in several different ways, the primary propulsion system of at least the towing vehicle 10 is an electric propulsion system. However, in some examples, the trailer vehicle unit 20 of the second trailer may comprises a corresponding electric propulsion system.

The towing vehicle 10 is illustrated in the form of a truck. The towing vehicle 10 comprises a traction motor 101 for propelling the wheels of the towing vehicle 10. The traction motor 101 is in the example embodiment an electric traction motor 101 in the form of an electric machine, which is arranged to receive electric power from an electric power system (104 in FIG. 2A) and/or directly from e.g., a fuel cell system.

If any one of the trailer vehicle units 20 is an electrified powered trailer, the trailer may comprise a corresponding electric machine.

Moreover, each one of the towing vehicle 10 and the trailer vehicle units 20 comprises one or more pair of wheels, and may often include a number of additional pair of wheels. At least some of the pair of wheels of the towing vehicle are driven by means of the electric machines. It should be readily appreciated that several different configurations may be conceivable depending on type of vehicle combination. By way of example, the truck may likewise be a hybrid truck including an internal combustion engine and the electric machine.

The towing vehicle 10 and trailer vehicle units 20 of the vehicle combination 1 can be mechanically coupled to each other in several different ways, e.g., by an articulated coupling. In FIG. 1, each one of the trailer vehicle units 20 comprises a coupling 22 configured to couple the corresponding trailer vehicle unit to another unit. By way of example, the first trailer vehicle unit 20 (semi-trailer) comprises the coupling 22 configured to couple the first trailer vehicle unit to the towing vehicle. By way of example, the truck 10 comprises a coupling part in the form of a fifth wheel configuration for the coupling 22 of the semi-trailer. Similarly, the semi-trailer comprises a rear coupling part 22 in the form of a rear drawbar for connecting with a drawbar of the second trailer. Accordingly, each one of the trailer vehicle units 20 in FIG. 1 is configured to couple with a towing vehicle and/or another trailer vehicle unit. In this manner the trailer units 20 are coupled to each other such that they move with respect to each other when the vehicle combination is in motion.

As illustrated in FIG. 1, each one of the trailer vehicle units 20 also comprises one or more electrical energy dissipating systems 40. Further details of some examples of electrical energy dissipating systems 40 will be described herein in relation to FIGS. 2A to 2D, FIG. 3 and FIG. 4.

In this example embodiment, each one of the electrical energy dissipating systems 40 is detachably arranged to the corresponding trailer vehicle units 20. By way of example, the trailer vehicle unit 20 comprises a mounting structure 60 for arrangement of the electrical energy dissipating system 40 to the trailer vehicle unit 20. The mounting structure is here an integral part of the trailer vehicle unit 20. In other examples, the mounting structure may an integral part of the electrical energy dissipating system 40. The mounting structure 60 is here further provided in the form of brackets configured to arrange the electrical energy dissipating system 40 to the trailer vehicle unit 20.

Moreover, in FIG. 1, the mounting structure 60 is arranged vertically below a supporting frame structure 24 of the trailer vehicle unit 20. Hence, each one of trailer vehicle units 20 comprises a supporting frame structure 24 for arrangement of the mounting structure 60. The supporting frame structure 24 may be a part of the chassis of the trailer vehicle unit 20.

In addition, each one of the electrical energy dissipating systems 40 is releasably attached to the mounting structure 60. By way of example, each one of the electrical energy dissipating system 40 is releasably attached to the mounting structure 60 by a number of fasteners, such as bolts and nuts.

In some designs, the electrical energy dissipating system 40 is configured to be retrofitted into already manufactured trailer vehicle unit. Alternatively, the trailer vehicle unit may be manufactured with the mounting structure 60 and the electrical energy dissipating system 40 releasably attached to the mounting structure.

Figure 2A:
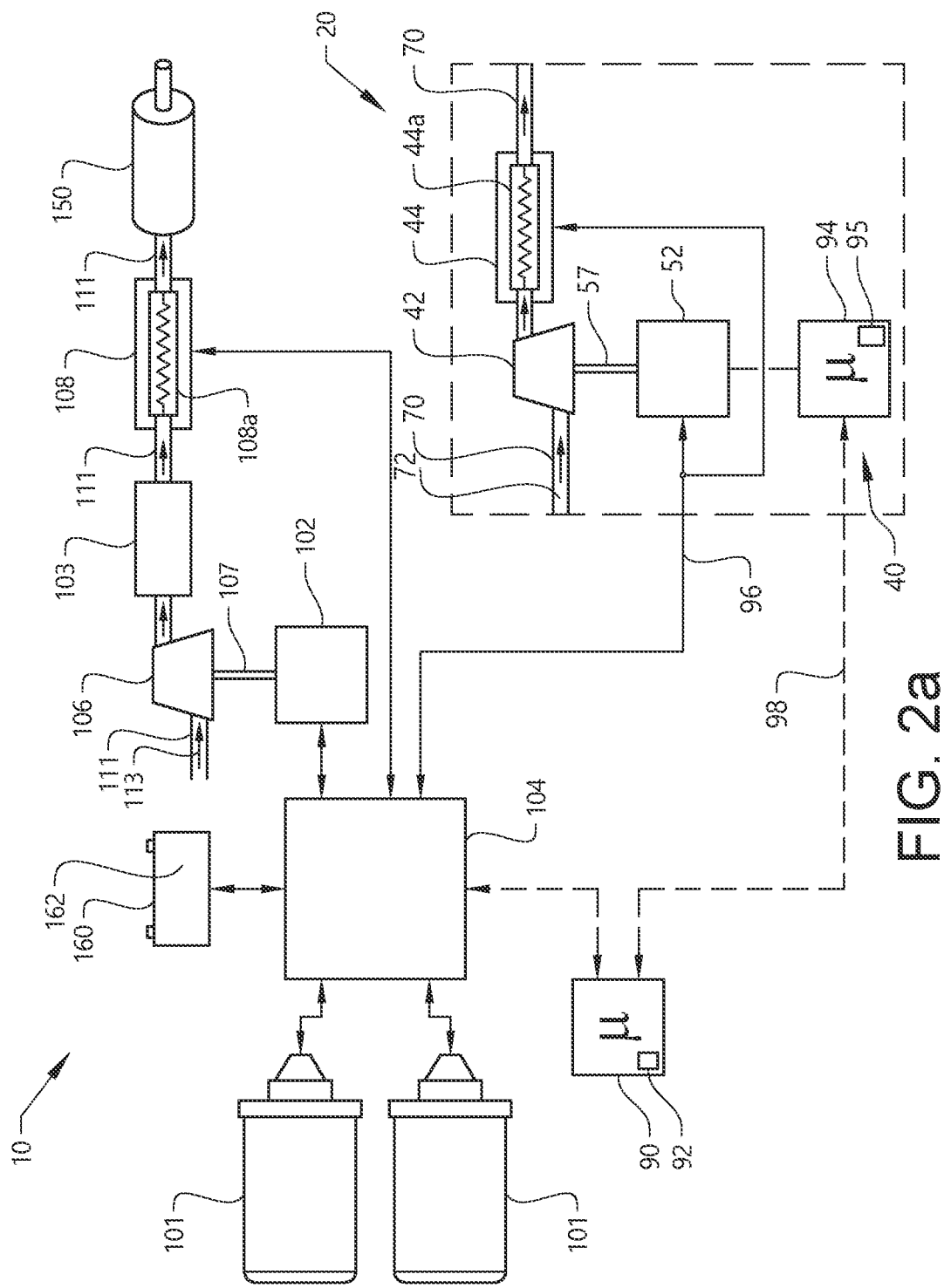
FIGS. 2A to 2D are schematic illustrations of systems for dissipating excessive energy from the vehicle combination in FIG. 1 according to various example embodiments.

Turning now to FIG. 2A, there is illustrated further details of one example embodiment of a trailer vehicle unit 20 coupled to the towing vehicle 10 so as to form the vehicle combination 1 in FIG. 1.

As illustrated in FIG. 2A, the towing vehicle 10 comprises a control unit 90 for controlling various operations as will also be described in further detail below, including at least an operation of performing an auxiliary braking action for the vehicle combination 1. In this example, the control unit 90 of the towing vehicle is a master control unit.

Analogously, the trailer vehicle unit 20, e.g., the semi-trailer or the second trailer in FIG. 1, comprises a slave control unit 90 for controlling various operations as will also be described in further detail below, but including at least an operation of performing an auxiliary braking action for the trailer vehicle unit 20. In this example, the slave control unit 94 of the trailer vehicle unit 20 is at least partly controllable by the master control unit 90 of the towing vehicle. The master control unit 90 and the slave control unit 94 here forms part of the control system of the vehicle combination 1.

Each one of the master control unit 90 and the slave control unit 94 generally comprises a corresponding processing circuitry 92, 95, respectively. The processing circuitry of each one of the master control unit 90 and the slave control unit 94 is generally a processor. Each one of the processors may each include a microprocessor, microcontroller, programmable digital signal processor or another programmable device. Each one of the processors may also, or instead, each include an application specific integrated circuit, a programmable gate array or programmable array logic, a programmable logic device, or a digital signal processor. Where each one of the processors includes a programmable device such as the microprocessor, microcontroller or programmable digital signal processor mentioned above, the processor may further include computer executable code that controls operation of the programmable device.

The master control unit 90 and the slave control unit 94 are in communication with each other via a communication interface 98. Typically, each one of the towing vehicle 10 and the trailer vehicle unit 20 comprises respective transceivers (although not shown) for receiving a request from each other.

Each transceiver may comprise a transmitter side and a receiver side or may constitute a combined device. Each transceiver may comprise or be connected to at least one antenna, which may be mounted on top of the corresponding vehicle and trailer vehicle unit, or underneath, or in a different suitable position. The antenna may comprise multiple antenna elements, especially on the receiver side.

In other words, the communication between the towing vehicle 10 and the trailer vehicle unit 20 is performed via the communication interface 98. The communication interface is here performed by a wireless link, such as a communications network defined by the third-generation partnership program, 3GPP. Examples of such networks include 4G, 5G and 6G communication networks, as well as networks in the 802.11 family, in particular 802.11p. Alternatively, or in addition, the communication interface is performed by wire, as is commonly known in the art.

Thus, the communication interface 98 provides for transmitting data between the truck 10 and the trailer vehicle unit 20.

It should also be noted that the towing vehicle and trailer vehicle unit are each configured to transfer and receive electric energy between each other in a coupled configuration forming the vehicle combination. By way of example, the transfer of surplus energy from the truck 10 to the trailer vehicle unit 20 may be handled via an electrical connection, here in the form of a conventional conductive coupling 96, as exemplified by the line 96 in FIG. 2A. The conductive coupling is here provided in the form of a pair of conventional connectors arranged on the respective vehicles 10 and 20. In other examples, the transfer of surplus energy from the truck 10 to the trailer vehicle unit 20 may be handled via an inductive coupling. Such electric energy transfer coupling can thus be provided in several different manners. The actual transfer of surplus energy from the towing vehicle 10 to the trailer vehicle unit 20 is generally controlled by the master control unit 90.

In general, as described herein, when the towing vehicle 10 and the trailer vehicle unit 20 form the vehicle combination 1, the control unit 90 of the truck 20 is generally the "master", while the control unit of the trailer vehicle unit 20 is configured to act in a slave mode. Hence, as long as the truck 20 is connected to the trailer vehicle unit 20, the truck 20 acts as master, while the one or more trailer vehicle units 20 operate in a slave mode. The communication between the master and slave mode control units 90 and 94 is either via wireless connection such as a unit to unit (U2U) communication or via some form of wired communication such as Ethernet communication between units.

Turning again to the components of the towing vehicle 10 and a driving operation involving a regenerative braking event, reference is made to FIG. 2A which is a schematic illustration of vehicle combination 1 comprising a trailer vehicle unit 20 according to an example embodiment. As can be seen in FIG. 2A, the towing vehicle 10 comprises an electric traction motor 101, in FIG. 2A illustrated as a pair of electric traction motors 101. The towing vehicle 10 further comprises an electric power system 104 which is connected to the electric traction motor(s) 101 for supply of electric power to the electric traction motor(s) 101 when the electric traction motor(s) 101 is/are propelling vehicle 10, and to receive electric power from the electric traction motor(s) 101 when the electric traction motor(s) 101 operates in a regenerative braking mode. Thus, the towing vehicle 10 comprises an auxiliary braking system. The towing vehicle 10 may of course also comprise conventional braking systems for the wheels.

The electric power system 104 further comprises an electric storage system 160. The electric storage system 160 is preferably arranged in the form of a vehicle battery and will in the following be referred to as a battery 162. The battery is generally a high voltage battery. The battery 162 is configured to receive electric power generated by the electric traction motor(s) 101 when the electric traction motor(s) 101 operates in the regenerative braking mode. The battery 162 is also arranged to supply electric power to the electric traction motor(s) 101 when the electric traction motor(s) 101 propel the vehicle 10. Although not depicted in FIG. 2A, the electric power system 104 may comprise various components, such as traction inverters, brake inverters, a junction box, etc.

The above-described master control unit 90 is connected to the electric power system 104. The master control unit 90 comprises the processing circuitry 92 for controlling operation of the electric power system. The master control unit 90 thus receives data from the electric power system 104, such as e.g., a state-of-(SOC) of the battery 162, etc, and transmits control signals to the electric power system 104. As will be evident from the below disclosure, the control signals from the master control unit 90 to the electric power system 104 may, for example, comprise instructions to which device the electric power system 104 should supply electric power during regenerative braking.

The towing vehicle 10 further comprises an electric machine 102 connected to the electric power system 104. The electric machine 102 is thus operated by receiving electric power from the electric power system 104. The electric machine 102 is thus arranged as an electric power consumer. The towing vehicle 10 also comprises an air blower 106. The air blower is an air flow producing unit. The air blower 106 is preferably an air compressor 106 and will in the following be referred to as such. The air compressor 106 is arranged in an air conduit 111 and configured to receive air 113. The received air 113 is pressurized by the air compressor 106 and supplied further through the air conduit 111 downstream the air compressor 106. The air compressor 106 is connected to, and operable by, the electric machine 102. As illustrated in FIG. 2A, the air compressor 106 is mechanically connected to the electric machine 102 by an output shaft 107 of the electric machine 102. In further detail, the air compressor 106 is operated by rotation of the output shaft 107, which rotation is generated by operating the electric machine 102.

According to the exemplified embodiment in FIG. 2A, the towing vehicle 10 further comprises a flow restriction arrangement 103 in the air conduit 111. The flow restriction arrangement 103 is arranged in downstream fluid communication with the air compressor 106 and configured to increase the pressure level of the flow of air exhausted by the air compressor 106. The towing vehicle 10 also comprises an air heating arrangement 108 in the air conduit 111. The air heating arrangement 108 comprises at least one electric air heater 108a. In the following, the air heating arrangement 108 will also be referred to as an electric brake resistor arrangement 108, and the electric air heater(s) will be referred to as electric brake resistors 108a.

The electric brake resistor arrangement 108 is arranged in the air conduit 111 in downstream fluid communication with the air compressor 106. The electric brake resistor arrangement 108 is also electrically connected to, and operable by, the electric power system 104. Thus, also the electric brake resistor arrangement 108 is arranged as an electric power consumer. When the electric brake resistor arrangement 108 receives electric power from the electric power system 104, the pressurized air from the air compressor is heated by the at least one brake resistor 108a. The pressurized and heated air is thereafter directed towards the ambient environment or other components in need of thermal management. The air from the electric brake resistor arrangement 108 is preferably directed into a muffler 150 of the braking system 100. The muffler 150 reduces noise and can also provide a pressure drop of the air.

The electric brake resistor arrangement 108 is preferably, although not depicted, connected to a cooling system in order to avoid excess heating. The cooling system may either be a liquid cooling system or an air-cooling system. Thus, the electric brake resistor arrangement 108 may be a liquid cooled electric brake resistor arrangement 108 or an air-cooled electric brake resistor arrangement 108.

Although not depicted in FIG. 2A, it should be readily understood that the master control unit 90 can be connected to other components in addition to the connection to the electric power system 104. For example, the master control unit 90 may be connected to the electric traction motor(s) 101, the battery 162, the electric machine 102, the air heating arrangement 108, as well as connected to an upper layer vehicle control system (not shown). The master control unit 90 is also connected to the slave control unit 94 when the trailer vehicle unit 20 is coupled to the towing vehicle 10.

During operation of the towing vehicle 10, i.e., when the electric traction motor 101 operates as generators to control the vehicle speed, i.e., the towing vehicle 10 operates in the regenerative braking mode, electric power is transmitted from the electric traction motor 101 to the electric power system 104. If the battery 162 is not able to receive all, or parts of the electric power generated by the electric traction motor 101, for example because of a current electric charging capacity, i.e. the level of electric power the battery is able to receive until being fully charged or has reached its maximum allowed state of charge level, the excess electric power should preferably be dissipated. In the present case, the electric power system 104 is controlled to supply electric power to the electric machine 102. The electric machine 102 is hereby, by the received electric power from the electric power system 104, rotating the output shaft 107 to operate the air compressor 106. The air compressor 106 in turn pressurize air 117 and supply the pressurized air further through the air conduit 111.

Turning now to the trailer vehicle unit 20 in FIG. 2A, there is depicted one example embodiment of a trailer vehicle unit 20 configured to transport cargo etc. when coupled to the towing vehicle 10. Similar to the components described above in relation to the towing vehicle 10, the trailer vehicle unit 20 also includes a functionality of dissipating excessive electric energy. Hence, as briefly mentioned above, and as illustrated in FIG. 2A, the trailer vehicle unit 20 comprises the electrical energy dissipating system 40. When the trailer vehicle unit 20 is coupled to the towing vehicle 10, as illustrated in FIG. 1, one or more components of the electrical energy dissipating system 40 is arranged in a connected state with one or more components of the towing vehicle, as will be described hereinafter.

In FIG. 2A, the electrical energy dissipating system 40 comprises an electric machine 52. The electric machine 52 is connected to the electric power system 104 of the towing vehicle by an electric connection 96. In this manner, electric energy from the electric power system 104 can be transferred to the electrical energy dissipating system 40.

As such, the electric machine 52 is configured to be operated by receiving electric power from the electric power system 104. In other words, the electric machine 52 is configured to be powered by the electric power system 104 of the towing vehicle 10. The electric machine 52 is thus arranged as an electric power consumer in the trailer vehicle unit 20.

In addition, the electrical energy dissipating system 40 is at least partly disposed in an air conduit 70 for receiving air. The air conduit 70 is generally similar in its configuration as the air conduit 111 of the towing vehicle 10. The air conduit 70 is here an integral part of the electrical energy dissipating system 40.

The electrical energy dissipating system 40 also comprises an air flow producing unit 42. The air flow producing unit 42 is preferably an air compressor and will in the following be referred to as such. The air compressor 42 is arranged in the air conduit 70 and configured to receive air 72. The received air 72 is generally air supplied from the ambient environment. Hence, the received air 72 is here ambient air. The received air 72 is pressurized by the air compressor 42 and supplied further through the air conduit 70 downstream the air compressor 42. The air compressor 42 is connected to, and operable by, the electric machine 52. As illustrated in FIG. 2A, the air compressor 42 is mechanically connected to the electric machine 52 by an output shaft 57 of the electric machine 52. In further detail, the air compressor 42 is operated by rotation of the output shaft 57, which rotation is generated by operating the electric machine 52. The output shaft 57 is here an integral part of the electric machine 42.

As further illustrated in FIG. 2A, the electrical energy dissipating system 40 comprises an air heating arrangement 44 in the air conduit 70. The air heating arrangement 44 comprises at least one electric air heater 44a. The electric air heater 44a is operable from the received electric energy. In the following, the air heating arrangement 44 will also be referred to as an electric brake resistor arrangement, and the electric air heater 44a will be referred to as an electric brake resistor.

The electric brake resistor arrangement 44 is arranged in the air conduit 70 in downstream fluid communication with the air compressor 42. The electric brake resistor arrangement 44 is also electrically connected to, and operable by, the electric machine 52. Thus, also the electric brake resistor arrangement 44 is arranged as an electric power consumer. When the electric brake resistor arrangement 44 receives electric power from the electric power system 104, the pressurized air from the air compressor 42 is heated by the at least one brake resistor 44a. The pressurized and heated air is thereafter directed towards the ambient environment or other components of the trailer vehicle unit 20 in need of thermal management. The air from the electric brake resistor arrangement 44 is preferably directed into a muffler (not illustrated). A muffler is configured to reduce noise and can also provide a pressure drop of the air.

The electric brake resistor arrangement 44 is possibly, although not depicted, connected to a cooling system of the trailer vehicle unit 20 in order to avoid excess heating. The cooling system may either be a liquid cooling system or an air-cooling system. Thus, the electric brake resistor arrangement 44 may be a liquid cooled electric brake resistor arrangement or an air-cooled electric brake resistor arrangement.

As mentioned above, the trailer vehicle unit 20 further comprises the slave control unit 94 having the processing circuitry 95. The processing circuitry 95 is configured to receive a control signal from the towing vehicle 10. In particular, the processing circuitry 95 is configured to receive a control signal from the corresponding processing circuitry 92 of the master control unit 90. The control signal generally contains data indicative of a request for dissipating energy from the electrical energy dissipating system 40, as further described herein. In FIG. 2A, a dashed line such as the line 98 generally refers to a communication line for transferring control signals of various types between the components.

In addition, the slave control unit 94 is in communication with the electrical energy dissipating system 40. More specifically, the slave control unit 94 is in communication with the electric machine 52, the air flow producing unit 42 and the air heating arrangement 44. Although not depicted in FIG. 2A, it should be readily understood that the slave control unit 94 can be connected to and in communication with other components in addition to the connection to the electrical energy dissipating system 40. For example, the slave control unit 94 may be connected to any electric traction motor(s) and battery of the trailer vehicle unit 20.

In particular, the slave control unit 94 is connected to the master control unit 90 when the trailer vehicle unit 20 is coupled to the towing vehicle 10. Accordingly, the slave control unit 94 is a so-called slave system to the higher-level brake dissipation demand from the towing vehicle truck 10.

In other words, the processing circuitry 95 of the slave control unit 94 is configured to receive a control signal from the towing vehicle 10 when the trailer vehicle unit 20 is in the coupled state with the towing vehicle 10. Hence, the processing circuitry 95 of the slave control unit 94 is configured to receive the control signal from the towing vehicle 10. The control signal is indicative of a request for dissipating energy from the electrical energy dissipating system 40 when the trailer vehicle unit 20 is in the coupled state with the towing vehicle 10. The coupled state thus generally refers to a state between the towing vehicle 10 and the trailer vehicle unit 20 wherein the trailer vehicle unit 20 is mechanically coupled to the towing vehicle 10, and wherein there is an electrical connection established between the trailer vehicle unit 20 and the towing vehicle 10. In addition, in the coupled state, there is a communication established between the slave control unit 94 of the trailer vehicle unit 20 and the master control unit 90 of the towing vehicle 10.

In operation of the vehicle combination 1, the processing circuitry 92 of the master control unit 90 determines a level of electric power dissipation for the electric power system 104, i.e., a level of electric power that should be dissipated since it is not suitable to supply such power to the battery 162. The level of electric power dissipation is hence a difference between the level of electric power generated during the regenerative braking and the current electric charging capacity of the battery 162. If the electric machine 102 is able to handle, i.e., receive and be operated by, electric power corresponding to the level of electric power dissipation, all excess electric power, i.e., the generated power not being supplied to the battery 162 for charging, is supplied to the electric machine 102.

However, the electric machine 102 may have a motor dissipation threshold. In further detail, the motor dissipation threshold is a maximum capacity of how much electric power the electric machine 102 can receive. Another limiting factor could be a temperature level of the air compressor 106, as well as a temperature level of the electric machine 102, e.g., at high ambient temperature conditions. If the electric machine 102 receives too much electric power, the rotational speed of the output shaft 107 is at a risk of being too high, or the temperature level of the electric machine or the air compressor 106 could be too high.

As such, the processing circuitry 92 of the master control unit 90 preferably compares the level of electric power generated during regenerative braking with the motor dissipation threshold. When the level of electric power generated during regenerative braking is higher than the motor dissipation threshold, the electric power system 104 is controlled to supply electric power to any one of the electric brake resistors 108a, the air compressor 106 and the electrical energy dissipating system 40 of the trailer vehicle unit 20.

If the master control unit 90 determines to supply electric energy to the electrical energy dissipating system 40 of the trailer vehicle unit 20, the master control unit 90 sends control signal and a request to the slave control unit 94 of the trailer vehicle unit 20. As mentioned above, the control signal generally contains a request for dissipating energy from the electrical energy dissipating system 40. When the slave control unit 94 receives the control signal from the towing vehicle 10, the processing circuitry 95 controls the electrical energy dissipating system to dissipate energy from the electrical energy dissipating system 40.

By way of example, the electrical energy dissipating system 40 may be controlled to receive the excess electric power from the electric power system 104 and further controlled to supply electric power to the electric machine 52. The electric machine 52 is hereby, by the received electric power from the electric power system 104, rotating the output shaft 57 to operate the air compressor 42. The air compressor 42 in turn pressurize air and supply the pressurized air further through the air conduit 70. In particular, the air compressor 42 is arranged to compress the received air and transmit the compressed air to the brake resistor arrangement 44.

The operation is thus generally similar to the operation as described above with regards to dissipating energy from the towing vehicle 10.

In addition, or alternatively, the electrical energy dissipating system 40 may be controlled to receive the excess electric power from the electric power system 104 and further controlled to supply electric power to the electric brake resistors 44a.

The request from the master control unit 90 to the slave control unit 94 is generally based on the current energy dissipation request for the towing vehicle 10, That is, the request from the master control unit 90 to the slave control unit 94 is generally based on a desired energy level of the electric storage system 160, 162 at an upcoming driving position for the vehicle combination 1.

Prior to the vehicle combination 1 arrives at the upcoming driving position, any one of the master control unit 90 and slave control unit 94 is configured to control the electrical energy dissipating system 40 to control the electric machine 52 to propel the air flow producing unit 42 for producing a flow of air to the brake resistor arrangement 44; and control the electrical energy dissipating system 40 to supply electric power to the brake resistor arrangement 44 for heating the air received by the brake resistor 44a.

Further, the split of electric power supply to the electric machine 42 and the electric brake resistor 44a can also, for example, be controlled to provide a desired brake performance, a low outlet temperature and/or to reduce wear of components of the trailer vehicle unit 20, etc. In particular, the temperature level of the electric brake resistor may be used as an input parameter when determining how much electric power to supply to the electric machine 52.

Any one of the master control unit 90 and slave control unit 94 are further configured to: determine, based on the current energy dissipation request, an amount of energy to dissipate from the electrical energy dissipating system 40; determine a first maximum operational power level of the air flow producing unit 42; determine a second maximum operational power level of the brake resistor arrangement 44; and control the electric machine 52 and the brake resistor arrangement 44 to dissipate the amount of energy without exceeding the first and second maximum operational power levels.

By way of example, the slave control unit 94 is further configured to:
- receive a signal indicative of a braking request for the vehicle combination 1, and
- control the electrical energy dissipating system 40 to dissipate energy, e.g., by controlling the electric machine 52 to propel the air flow producing unit 42 and/or the electric machine 52 to supply electric power to the brake resistor arrangement 44 when the vehicle combination requests braking.

Further control functionalities of the electrical energy dissipating system 40 will be given below in relation to the description of FIG. 4.

Figure 2B:
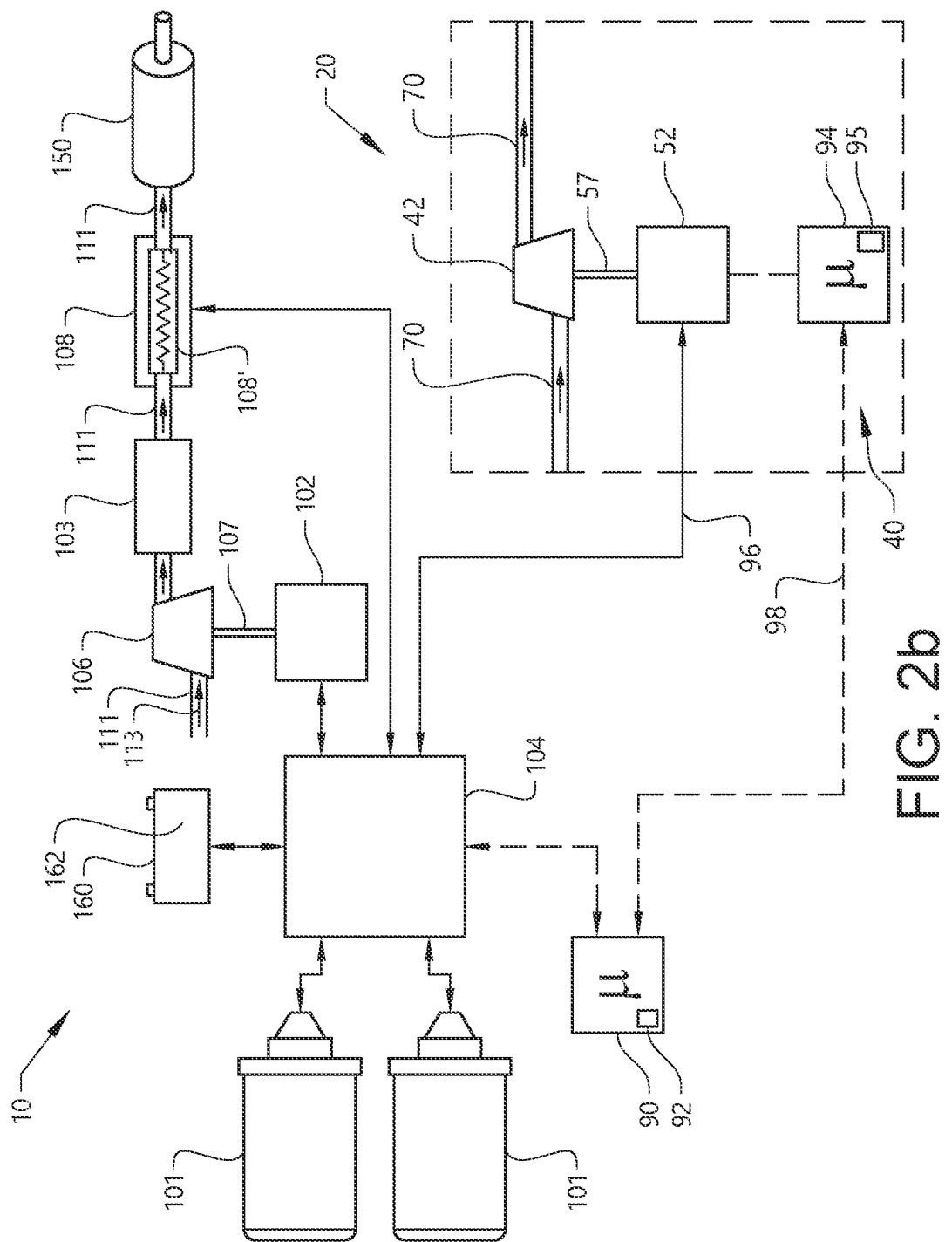

FIG. 2B depicts another example embodiment of an electrical energy dissipating system 40. The functional operation of the towing vehicle 10 and the trailer vehicle unit 20 in FIG. 2B is generally the same as described above in relation to FIG. 2A. The electrical energy dissipating system 40 in FIG. 2B is, however, not provided with the air heating arrangement 44, as described in relation to FIG. 2A. Rather, the electrical energy dissipating system 40 in FIG. 2B here comprises the electric machine 52 and further the air flow producing unit 42 connected to the output shaft 57 of the electric machine 52. The air flow producing unit 42 is here an air compressor operable by the electric machine 42 by rotation of the output shaft 57. Further, as illustrated in FIG. 2B, the air compressor 42 is arranged in the air conduit 70. The electrical energy dissipating system 40 also includes the output shaft 57 connecting the electric machine 52 with the air compressor 42. The electrical energy dissipating system 40 in FIG. 2B is also controlled in similar vein as the system in FIG. 2A, i.e., by the slave control unit 94 upon a request from the towing vehicle 10.

Figure 2C:
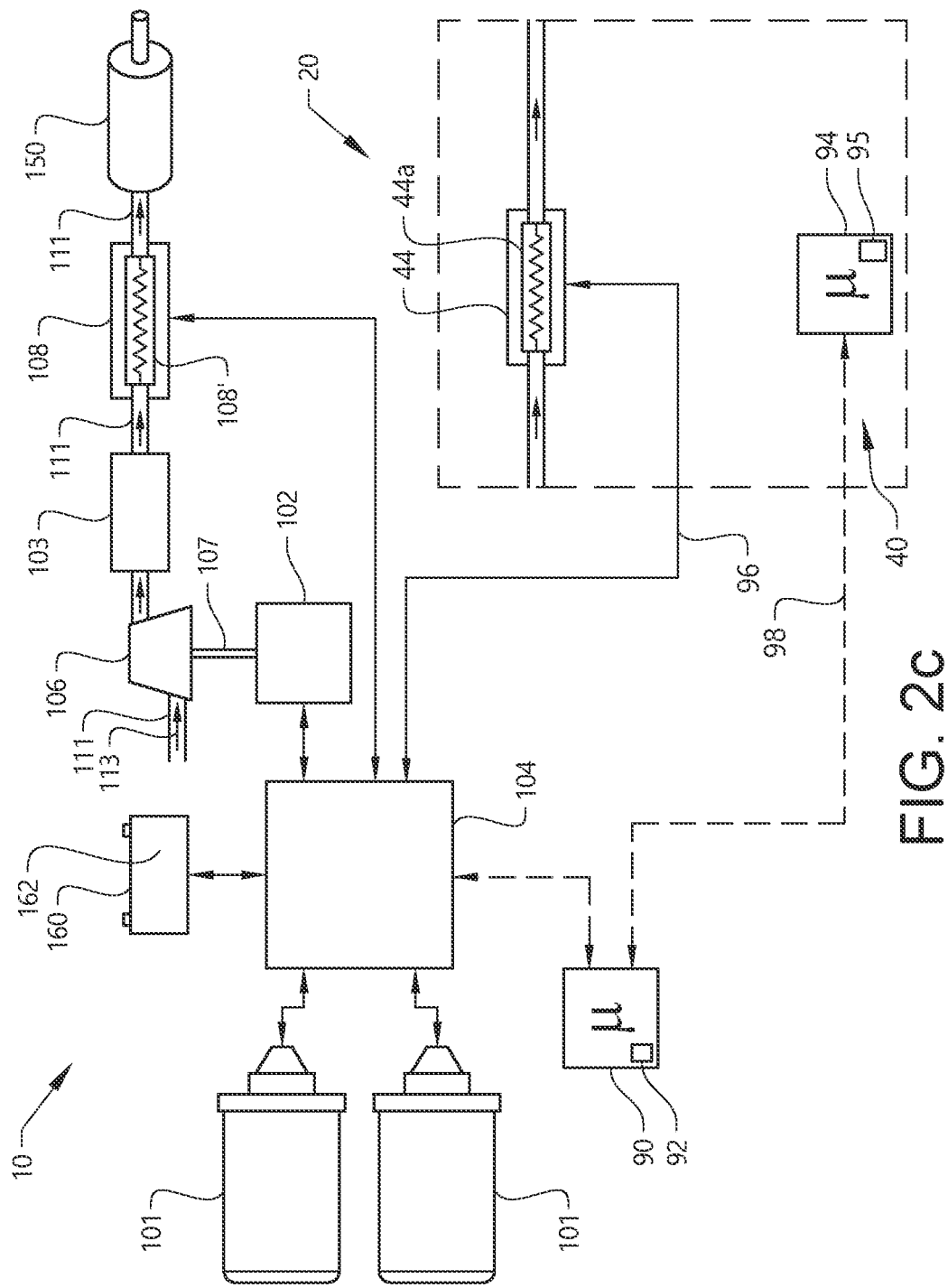

FIG. 2C depicts another example embodiment of an electrical energy dissipating system 40. The functional operation of the towing vehicle 10 and the trailer vehicle unit 20 in FIG. 2C is generally the same as described above in relation to FIG. 2A. The electrical energy dissipating system 40 in FIG. 2C is, however, not provided with the electric machine 52 and the air flow producing unit 42, as described in relation to FIG. 2A. Rather, the electrical energy dissipating system 40 in FIG. 2C here comprises the air heating arrangement 44. The air heating arrangement 44 comprises the electric air heater 44a operable by electric energy. The electric air heater 44a is here an electric brake resistor. Further, as illustrated in FIG. 2C, the electric air heater 44a is arranged in the air conduit 70. The electric air heater 44a of the electrical energy dissipating system 40 is operable by electric energy from the towing vehicle 10, as described above. The electrical energy dissipating system 40 in FIG. 2C is also controlled in a similar vein as the system in FIG. 2A, i.e., by the slave control unit 94 upon a request from the towing vehicle 10.

In another example embodiment of the electrical energy dissipating system 40, the air conduit is replaced with a liquid coolant conduit. Further, the air heating arrangement with the electric air heater is here a liquid coolant heating arrangement having an electric liquid coolant heater operable by electric energy. The electric liquid coolant heater is an electric brake resistor. Hence, this example arrangement resembles the example embodiment in FIG. 2C in terms of the arrangement of the component. That is, the electric brake resistor is still operable by electric energy supplied from the electric power system 140, but it is disposed in another type of conduit, namely a fluid medium conduit in the form of a liquid coolant fluid medium. The liquid coolant is e.g., a coolant based on glycol. Hence, to sum up, this example embodiment provides a trailer vehicle unit 20 having an electrical energy dissipating system 40 comprising a liquid coolant heating arrangement.

The liquid coolant heating arrangement comprises at least one electric brake resistor arrangement operable from the received electric energy. The liquid coolant heating arrangement is further arranged in the liquid coolant conduit. In an example with a liquid coolant conduit, the liquid coolant conduit is a recirculation conduit, i.e., a closed coolant circuit loop (not illustrated in FIG. 2C). Typically, there is also disclosed a cooler in the liquid coolant conduit. The cooler is configured to regulate the temperature of the coolant. The cooler can be a heat exchanger, a condenser, or the like, and may further include a fan (not illustrated). Optionally, there is also disposed a coolant pump (not illustrated) in the liquid coolant conduit for pumping the coolant therethrough. As such, this example embodiment with a liquid coolant works by passing liquid continually through or around the electric brake resistor arrangement. Powered by the coolant pump, the coolant is circulated through the conduit and absorbs heat from the electric brake resistor.

Figure 2D:
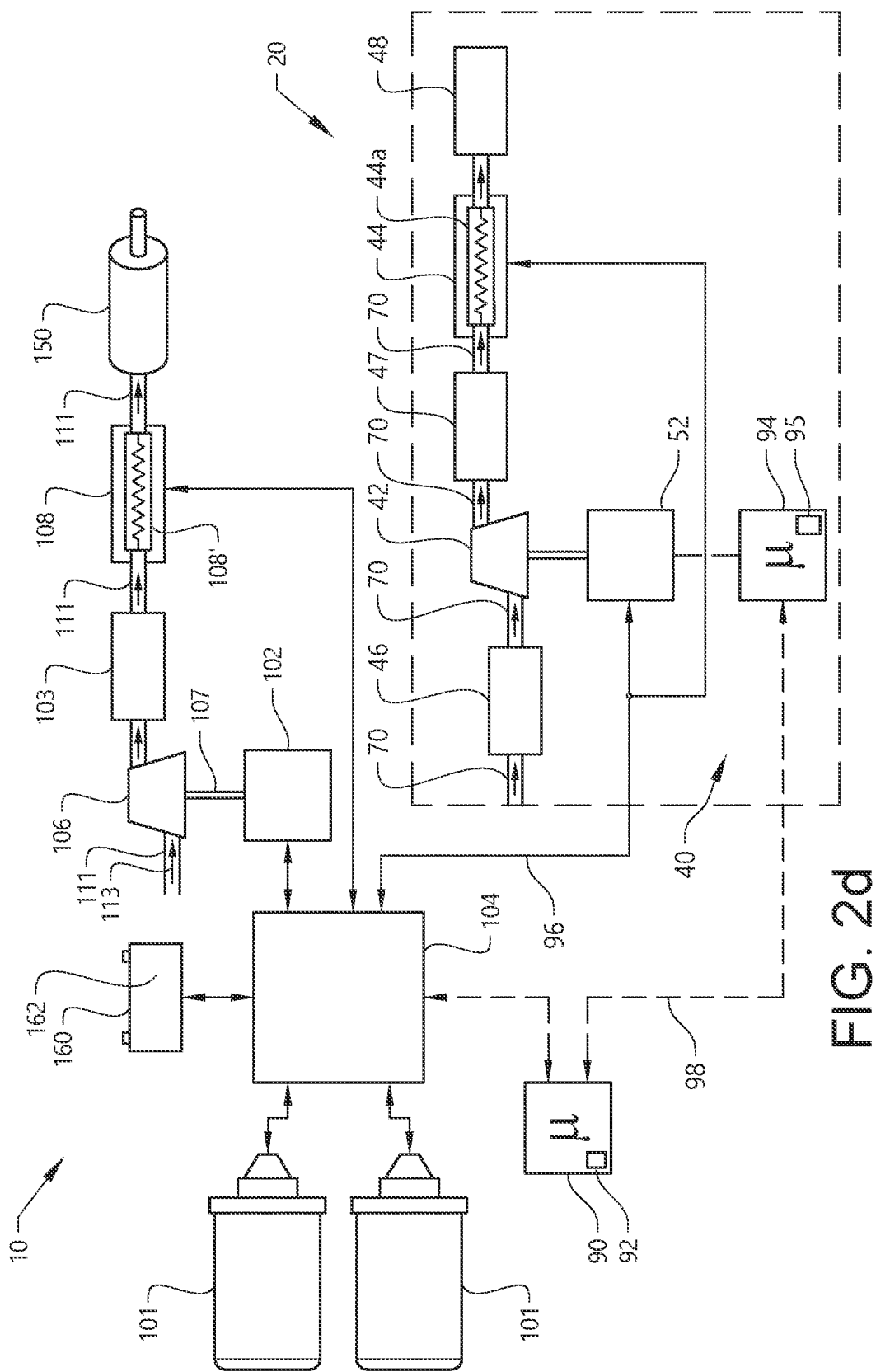

FIG. 2D depicts another example embodiment of an electrical energy dissipating system 40. The functional operation of the towing vehicle 10 and the trailer vehicle unit 20 in FIG. 2D is generally the same as described above in relation to FIG. 2A. The embodiment in FIG. 2D only describes the components arranged in direct connection with the air conduit 70. Hence, the electrical energy dissipating system 40 in FIG. 2D comprises the components as described in relation to FIG. 2A.

As illustrated in FIG. 2D, the electrical energy dissipating system 40 further comprises a flow restriction arrangement 47 in the air conduit 70. The flow restriction arrangement 47 is arranged in downstream fluid communication with the air compressor 42 and configured to increase the pressure level of the flow of air exhausted by the air compressor 42.

Moreover, the electrical energy dissipating system 40 here comprises an air flow restriction arrangement 48 positioned downstream the air heating arrangement 44.

In addition, the electrical energy dissipating system 40 here comprises an air heating arrangement in the form of a heat exchanger 46. The heat exchanger 46 is arranged upstream the air compressor 42 in air conduit 70.

Figure 3:
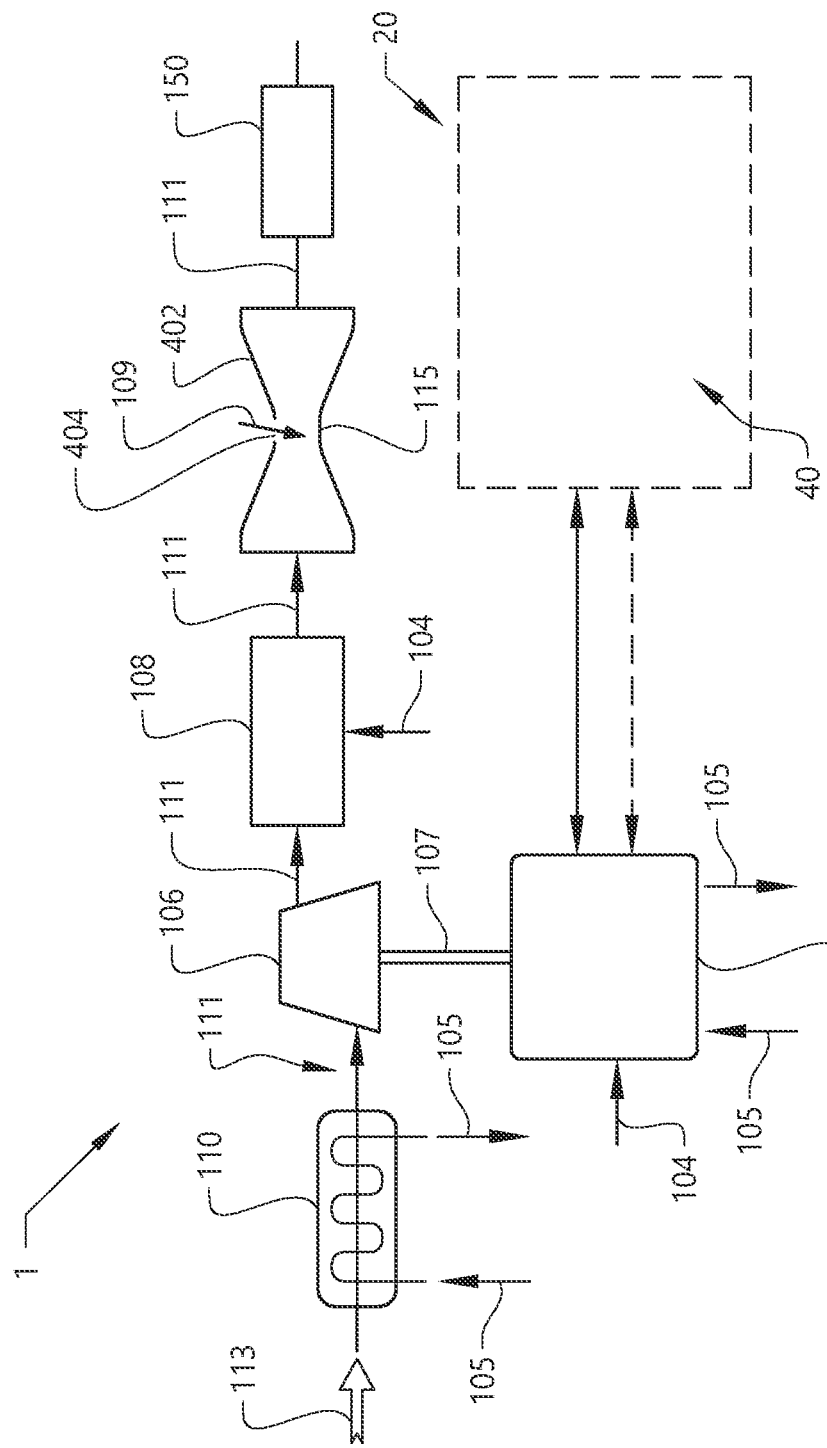
FIG. 3 is a detailed schematic illustration of one system for dissipating excessive energy from the vehicle combination in FIG. 1, according to another example embodiment.

Reference is now made to FIG. 3 in order to describe another example embodiment of the towing vehicle 10 that can be combined with the electrical energy dissipating system 40 of the trailer vehicle unit 20. The FIG. 3 example is a further detailed illustration of components that may form part of the towing vehicle 10. The embodiment in FIG. 3 only describes the components arranged in direct connection with the air conduit 111. The functional operation of the towing vehicle 10 and the trailer vehicle unit 20 in FIG. 3 is thus the same as described above in relation to FIG. 2A. The master control unit 90 is omitted from FIG. 3 and the following description but should be construed as also being incorporated in this example embodiment.

As can be seen in FIG. 3, the towing vehicle 10 comprises the electric machine 102 arranged to receive electric power from the electric power system 104 described above in relation to FIG. 2A. Moreover, the electric machine 102 can also be connected to a cooling system 105 of the vehicle 10. The cooling system 105 may either be a liquid cooling system or an air-cooling system.

The towing vehicle 10 further comprises the above-described air compressor 106, which here is mechanically connected to, and operated by, the electric machine 102. Preferably, the air compressor 106 is mechanically connected to the electric machine 102 by the output shaft 107.

The towing vehicle 10 further comprises the above-described air heating arrangement 108, 110. In FIG. 3, one of the air heating arrangements 108, 110 is arranged upstream the air compressor 106 in the form of a heat exchanger 110. The air heating arrangement 108 arranged downstream the air compressor 106 is preferably of the same type as described above, i.e., an electric brake resistor arrangement 108.

Similar to the embodiment described in relation to FIG. 2A, the electric air heating arrangement 108 may be arranged in the air conduit 111 at a position downstream the air compressor 106, i.e., for receiving pressurized air from the air compressor 106. The electric air heating arrangement 108 is connected to the electric power system 104.

As also described above, the electric air heating arrangement 108 is preferably implemented in the form of an electric brake resistor arrangement 108 comprising at least one electric brake resistor 108. The electric air heating arrangement 108 thus receives the pressurized air from the air compressor 106, whereby the air is heated in the electric air heating arrangement by the electric power received from the electric power system 104. The air is thereafter preferably supplied towards the muffler 150 and further to the ambient environment or a component/structure in need of thermal management.

Further, the heat exchanger 110 is arranged in upstream fluid communication with the air compressor 106 in the air conduit 111. The heat exchanger 110 can instead be arranged further downstream in the air conduit 111, and the illustration in FIG. 3 is merely for illustrative purposes. The heat exchanger 110 is in FIG. 3 arranged as a heat exchanger connected to the cooling system 105 of the towing vehicle 10. Thus, the heat exchanger receives liquid fluid from the cooling system 105 and pre-heats the air before it is delivered to the air compressor 106. The heat exchanger 110 is thus preferably an air-to-liquid heat exchanger but may, as an alternative, be an air-to-air heat exchanger which uses relatively warm air to heat the air that is supplied to the air compressor 106. As a not depicted alternative, the heat exchanger 110 may be replaced by the electric machine 102. In such a case, the electric machine receives the air, and pre-heats the air before the air is supplied to the air compressor 106. The heat exchanger 110 may also be arranged at other positions in the material transportation system of the vehicle combination 1 than what is depicted in FIG. 3. For example, the heat exchanger 110 may be in the air conduit 111 downstream the air compressor 106. The arrangement described in FIG. 3 may also be used in other vehicle combinations, e.g., in combination with a sand blasting equipment, steamer, etc.

Furthermore, the exemplified towing vehicle 10 of FIG. 3 comprises a flow injecting arrangement 402 positioned in the air conduit 111. The flow injecting arrangement 402 is arranged in downstream fluid communication with the air compressor 106, i.e., the flow injecting arrangement 402 receives the pressurized air exhausted from the air compressor 106. Although the flow injecting arrangement 402 is depicted as being positioned downstream the air compressor 106, it could instead, or in addition, be arranged upstream the air compressor 106. Although not depicted in detail in FIG. 3, the flow injecting arrangement 402 comprises a portion configured to admit a flow of fluid into the flow of air exhausted from the air compressor 106. As can be seen in FIG. 3, the flow injecting arrangement 402 is arranged in the form of a venturi arrangement comprising a constricted portion 115. The flow injecting arrangement may as an alternative be formed by e.g., a pump injecting a flow through a nozzle, etc. The constricted portion 115 is arranged as a reduced diameter of the venturi arrangement in which the flow velocity of the flow of air from the air compressor 106 will increase. The portion configured to admit the flow of fluid into the venturi arrangement is preferably arranged at the constricted portion 115 of the venturi arrangement. As can be seen in FIG. 3, the portion is arranged as an orifice 404 in which a flow of fluid 109 can enter the constricted portion 115. According to the example embodiment depicted in FIG. 3, the venturi arrangement 402 is arranged in downstream fluid communication with the electric air heating arrangement 108. It should however be readily understood that the venturi arrangement 402 can be arranged in upstream fluid communication with the electric air heating arrangement 108, i.e., between the air compressor 106 and the electric air heating arrangement 108.

Turning now to an example of a braking force strategy for the vehicle combination 1, including the operation of the electrical energy dissipating system 40 so as to dissipate excessive energy generated from a regenerative braking event of the vehicle combination. The electrical energy dissipating system 40 can be provided according to any one of the systems 40 described in relation to FIGS. 2A to 2D and FIG. 3.

In regard to the master control unit 90 of the towing vehicle 10, the processing circuitry 92 is arranged in communication with the electric power system 104 of the towing vehicle 10. Moreover, the processing circuitry 92 is configured to control the electrical energy dissipating system 40 of the trailer vehicle unit 20. Typically, the processing circuitry 92 is configured to control the electrical energy dissipating system 40 of the trailer vehicle unit 20 by communicating one or more control signals to the slave control unit 94. The slave control unit 94 is here configured to control the operation of receiving electric energy from the towing vehicle 10 to the electrical energy dissipating system 40 in response to the received signal from the master control unit 90 of the towing vehicle 10. In this manner, the slave control unit 94 is configured to control and permit the electrical energy dissipating system 40 to receive electrical energy and dissipate the received electrical energy generated from the regenerative braking operation of the towing vehicle 10.

In particular, the master control unit 92 is configured to receive the signal indicative of a regenerative braking request for the vehicle combination 1, determine a level of electric power generated by the electric traction motor 101 during the regenerative braking of the vehicle combination 1, receive a signal indicative of a current electric charging capacity of the electric storage system 160, compare the level of electric power generated during the regenerative braking with the current electric charging capacity of the electric storage system 160, and control the electric power system 104 to supply electric power to the electrical energy dissipating system 40 during the regenerative braking when the level of electric power generated during the regenerative braking is higher than the current charging capacity of the electric storage system 160.

The master control unit 90 is further configured to selectively control the electric power system 104 to supply electric power to any one of the electrical energy dissipating system 40 and the electric machine 102 during the regenerative braking when the level of electric power generated during the regenerative braking is higher than the current charging capacity of the electric storage system 160.

It should also be noted that the slave control unit 94 is configured to control the supply of electric energy from a traction electric motor of the trailer vehicle unit 20 to the electrical energy dissipating system 40 in response to control signal from the master control unit 90 of the towing vehicle 10. In this manner, the slave control unit is configured to control and permit the electrical energy dissipating system 40 to dissipate the received electrical energy generated from a regenerative braking operation of the trailer vehicle unit 20, when connected to the towing vehicle 10. Such situation may e.g., arise when the trailer vehicle unit 20 comprises its own electric drive axle arrangement. Electric drive axle arrangement for trailers can be provided in several different ways, but may generally include one or more electric hub motors for providing traction to one or more wheels. To this end, the electrical energy dissipating system 40 is configured to receive electric energy from the electric hub motors of the trailer vehicle unit 20. The combination of the electrical energy dissipating system 40 in the trailer vehicle unit 20 and an electric drive axle arrangement may be particularly suitable for avoiding, or at least reducing the risk of jack knifing between the tractor vehicle 10 and the trailer vehicle unit 20. The combination of the electrical energy dissipating system 40 in the trailer vehicle unit 20 and the electric drive axle arrangement provides for enhance energy dissipation so as to allow braking with the trailer vehicle unit 20 and any traction motors on the trailer vehicle unit.

Figure 4:
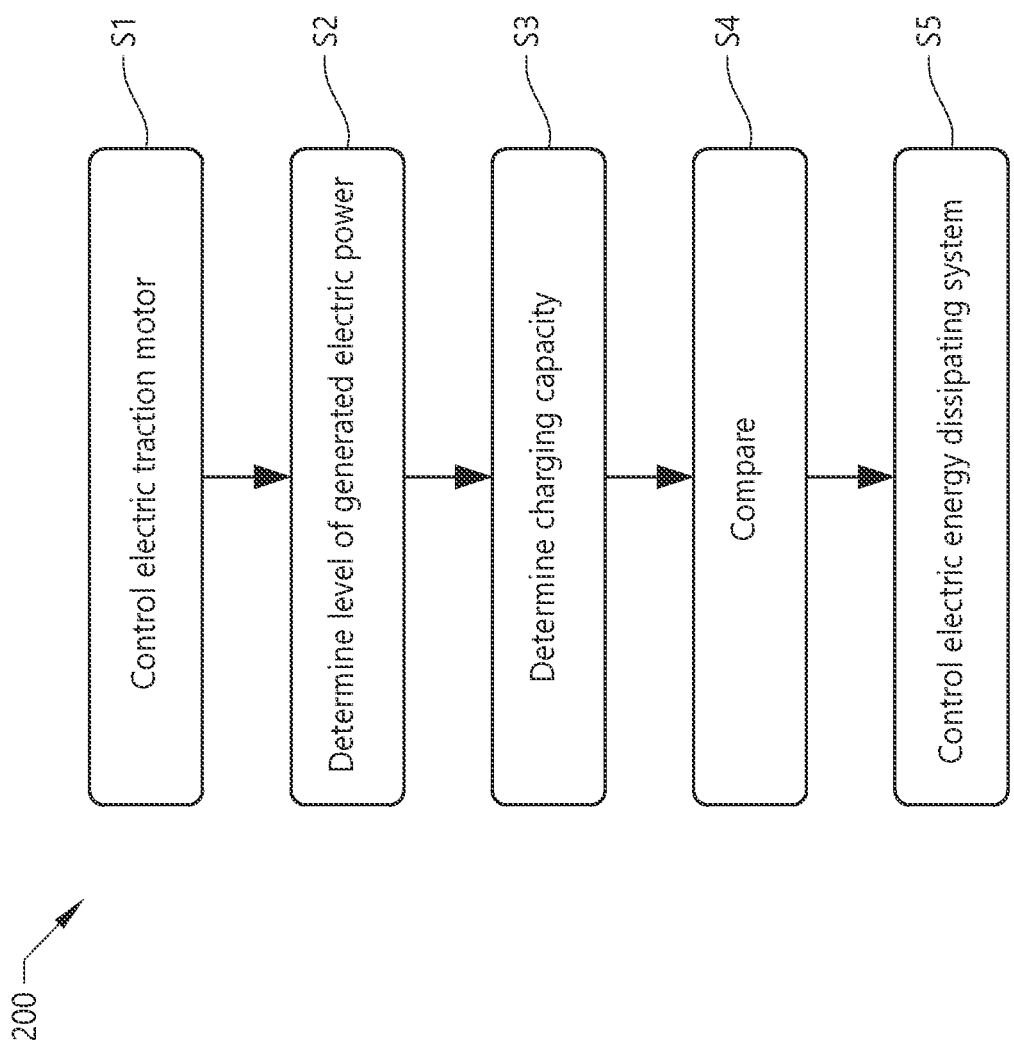
FIG. 4 is a flow chart of a method of controlling the system according to an example embodiment.

In order to sum up, reference is made to FIG. 4 which is a flow chart of a method 200 of controlling the electrical energy dissipating system 40 of the trailer vehicle unit 20 when coupled to the towing vehicle 10. During operation of the vehicle combination 1, i.e., when the trailer vehicle unit 20 is coupled to the towing vehicle 10, and when there is a desire to control the vehicle speed, the electric traction motor 101 is controlled S1 to perform regenerative braking of the towing vehicle 10. A level of electric power generated by the electric traction motor 101 during the regenerative braking is determined S2, and a current electric charging capacity of the battery 162 is determined S3. These steps, S1 to S3, are generally performed by the master control unit 90. Optionally, these steps may be performed by support from the slave control unit 94.

Subsequently, the level of generated electric power is compared S4 with the charging capacity. This step is generally performed by the master control unit 90. Optionally, this step may also be performed by support from the slave control unit 94.

When the level of electric power generated during the regenerative braking is higher than the current charging capacity of the battery 162, the electric power system 104 is controlled to supply electric power to the electrical energy dissipating system 40, wherein the electrical energy dissipating system 40 is controlled to receive the electric power from the towing vehicle 10 and further controlled to dissipate the received electric power by utilizing the flow of air, as described above. The electric power system 104 is generally controlled by the master control unit 90, as mentioned above. In addition, the electrical energy dissipating system 40 is generally controlled by the slave control unit 94, as mentioned above. However, it may be noted that the master control unit may indirectly control the operation of the electrical energy dissipating system 40 by the control signal to the slave control unit 94.

By way of example, the slave control unit 94 is typically configured to control the distribution of excessive electric energy to any one of the electric consumers of the electrical energy dissipating system 40. By way of example, the slave control unit 94 is configured to control the electrical energy dissipating system 40 so that excessive electric energy is distributed to the electric machine 52 and to the electric brake resistors 44 in response to the received control signal from the master control unit 90. The distribution of electric energy to the electric machine 52 and to the electric brake resistors 44 can either be performed in a simultaneous manner or in a selective manner.

Accordingly, as described herein, the control of the electrical energy dissipating system 40 relates not only to the need for braking of the vehicle combination, but also the available capacity of the braking capacity of the vehicle combination 1. By way of example, when the master control unit 90 has received information of a connected slave control unit 94 and data indicating information about the trailer vehicle unit's braking capacity, the control of the vehicle combination in regard to braking and regenerative braking can be optimized for this particular vehicle combination. So, if the trailer vehicle unit 20 provides for a high auxiliary brake power capacity to the vehicle combination, the control in regard to charging and braking can be adjusted accordingly, e.g., permitting a later operation of dissipating energy from the system 40 if the braking capacity of the trailer vehicle unit 20 is higher compared to a trailer without such system 40. This will lead to an overall improved energy management for the vehicle combination during operating.

It should be noted that the trailer vehicle unit 20 may of course also comprise a conventional braking system for the wheels. Such braking system may e.g., be a conventional disc brake or the like.

In addition, the trailer vehicle unit 20 may generally comprise additional components such as power electronics and electrical connections to connect and control the components of the electrical energy dissipating system.

The invention also relates to the vehicle combination 1 formed by the towing vehicle 10 and one or more trailer vehicle units 20, as described herein. It should be noted that the trailer vehicle unit 20 may be coupled to any type of towing vehicle with a control unit and an energy management system for dissipating excessive energy from a regenerative braking event, and thus not necessarily a towing vehicle as described in relation to FIG. 1. Hence, one conceivable example is a system where there only are the controls at high level in the truck, but no actual component configured to dissipate energy within the towing vehicle 10, such as the compressor and/or braking resistor in the towing vehicle 10.

It is to be understood that the present disclosure is not limited to the embodiments described above and illustrated in the drawings; rather, the skilled person will recognize that many changes and modifications may be made within the scope of the appended claims.

The invention claimed is:

1. A trailer vehicle unit for a towing vehicle, the trailer vehicle unit having a coupling configured to couple the trailer vehicle unit to the towing vehicle, and further an electrical energy dissipating system at least partly disposed in a fluid medium conduit for receiving a fluid medium, the electrical energy dissipating system being configured to receive electric energy and to dissipate received electric energy by utilizing a flow of fluid medium, wherein the trailer vehicle unit further comprises a slave control unit having a processing circuitry configured to receive a control signal from the towing vehicle indicative of a request for dissipating energy from the electrical energy dissipating system, the processing circuitry further being configured to control the electrical energy dissipating system in response to the received control signal so as to dissipate energy from the electrical energy dissipating system.

2. The trailer vehicle unit of claim 1, wherein the fluid medium is air and the fluid medium conduit is an air conduit for receiving air.

3. The trailer vehicle unit of claim 2, wherein the electrical energy dissipating system comprises an electric machine operable by the received electric energy and further an air flow producing unit connected to an output shaft of the electric machine, the air flow producing unit being operable by the electric machine by rotation of the output shaft, and wherein the air flow producing unit is arranged in the air conduit.

4. The trailer vehicle unit of claim 2, wherein the electrical energy dissipating system comprises an air heating arrangement comprising at least one electric air heater operable from the received electric energy, the air heating arrangement being arranged in the air conduit.

5. The trailer vehicle unit of claim 4, wherein the at least one electric air heater is arranged in the air conduit in downstream fluid communication with the air flow producing unit.

6. The trailer vehicle unit of claim 4, wherein the electrical energy dissipating system further comprises an air flow restriction arrangement positioned downstream the air heating arrangement.

7. The trailer vehicle unit of claim 1, wherein the fluid medium is a liquid coolant and the fluid medium conduit is a liquid coolant conduit, and wherein the electrical energy dissipating system comprises a liquid coolant heating arrangement, the liquid coolant heating arrangement being disposed in the liquid coolant conduit and comprising at least one electric brake resistor arrangement operable from the received electric energy.

8. The trailer vehicle unit of claim 1, further comprising a mounting structure for arrangement of the electrical energy dissipating system to the trailer vehicle unit.

9. The trailer vehicle unit of claim 8, wherein the mounting structure is arranged vertically below a supporting frame structure of the trailer vehicle unit.

10. The trailer vehicle unit of claim 8, wherein the electrical energy dissipating system is releasably attached to the mounting structure.

11. The trailer vehicle unit of claim 1, wherein the electrical energy dissipating system is configured to be retrofitted into the trailer vehicle unit.

12. The trailer vehicle unit of claim 1, wherein the trailer vehicle unit comprises an electric drive axle arrangement having one or more electric hub motors for providing traction to one or more wheels, and wherein the electrical energy dissipating system is configured to receive electric energy from the one or more electric hub motors.

13. The trailer vehicle unit of claim 1, wherein the slave control unit is configured to control the supply of electric energy from the towing vehicle to the electrical energy dissipating system in response to the received signal from the towing vehicle so as to permit the electrical energy dissipating system to dissipate received electrical energy generated from regenerative braking event of the towing vehicle.

14. A vehicle combination formed by a towing vehicle and one or more of the trailer vehicle units of claim 1.

15. The vehicle combination of claim 14, wherein the towing vehicle comprises a master control unit having a processing circuitry configured to control the electrical energy dissipating system of the trailer vehicle unit.

16. The vehicle combination of claim 15, wherein the master control unit is arranged in communication with an electric power system of the towing vehicle, the master control unit being configured to:

receive a signal indicative of a regenerative braking request for the vehicle combination, determine a level of electric power generated by an electric traction motor during the regenerative braking of the vehicle combination, receive a signal indicative of a current electric charging capacity of an electric storage system, compare the level of electric power generated during the regenerative braking with the current electric charging capacity of the electric storage system, and control the electric power system to supply electric power to the electrical energy dissipating system during the regenerative braking when the level of electric power generated during the regenerative braking is higher than the current charging capacity of the electric storage system.

17. The vehicle combination of claim 16, wherein the towing vehicle comprises the electric traction motor configured to propel the towing vehicle and to controllably regenerate electric power during regenerative braking of the vehicle combination, the electric machine, the electric power system electrically connected to the electric machine, and the electric power system comprising the electric storage system configured to receive and supply electric power, wherein the electric machine is operated by electric power received from the electric power system, the electric power system being further electrically connected to the electric traction motor and configured to receive electric power during regenerative braking, and wherein the master control unit is configured to selectively control the electric power system to supply electric power to the electrical energy dissipating system or to the electric machine during the regenerative braking when the level of electric power generated during the regenerative braking is higher than the current charging capacity of the electric storage system.

* * * * *